(12) United States Patent
Byma et al.

(10) Patent No.: US 7,159,920 B2
(45) Date of Patent: Jan. 9, 2007

(54) OVERHEAD CONSOLE ASSEMBLY

(75) Inventors: George B. Byma, Clarkston, MI (US); Grant Colyn, Birmingham, MI (US); Yu-Jin J Song, Sterling Heights, MI (US); Te Phan, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 168 days.

(21) Appl. No.: 10/895,571

(22) Filed: Jul. 21, 2004
(Under 37 CFR 1.47)

(65) Prior Publication Data
US 2006/0017302 A1    Jan. 26, 2006

(51) Int. Cl.
*B60N 3/12*    (2006.01)

(52) U.S. Cl. .................. 296/37.8; 296/37.7; 296/24.34; 224/311

(58) Field of Classification Search ............... 296/37.8, 296/24.34, 37.7; 224/311
See application file for complete search history.

(56) References Cited

U.S. PATENT DOCUMENTS

| | | | |
|---|---|---|---|
| 4,867,498 A | 9/1989 | Delphia et al. | |
| 5,020,845 A | 6/1991 | Falcoff et al. | |
| 6,062,623 A | 5/2000 | Lemmen | |
| 6,267,428 B1 | 7/2001 | Baldas et al. | |
| 6,338,517 B1 | 1/2002 | Canni et al. | |
| 6,575,528 B1 | 6/2003 | Tiesler et al. | |
| 6,619,716 B1 | 9/2003 | Sturt | |
| 6,669,260 B1 | 12/2003 | Clark et al. | |
| 6,971,699 B1 * | 12/2005 | Isaacson | 296/37.8 |
| 2002/0163219 A1 | 11/2002 | Clark et al. | |
| 2003/0168875 A1 | 9/2003 | Anderson et al. | |
| 2003/0184111 A1 | 10/2003 | Sturt | |

* cited by examiner

*Primary Examiner*—Joseph D. Pape
(74) *Attorney, Agent, or Firm*—Brooks Kushman P.C.

(57) ABSTRACT

An overhead console assembly mounted to a headliner in a passenger compartment of a vehicle. The overhead console assembly includes an overhead console housing configured for attachment adjacent to a lower surface of the headliner or frame of the vehicle roof. The console housing includes a lower surface, at least one channel in the lower surface and opposing pivotally mounted first and second doors at least partially covering the lower surface. At least one storage module is releasably securable and adjustably positionable within the channel in the overhead console housing. The at least one storage module includes a housing having a top surface, a bottom surface, a sidewall extending therebetween defining a receiving area therebetween accessible through an opening in the sidewall. An accessory module removably mountable within the receiving area of the storage module housing receives and stores items.

12 Claims, 3 Drawing Sheets

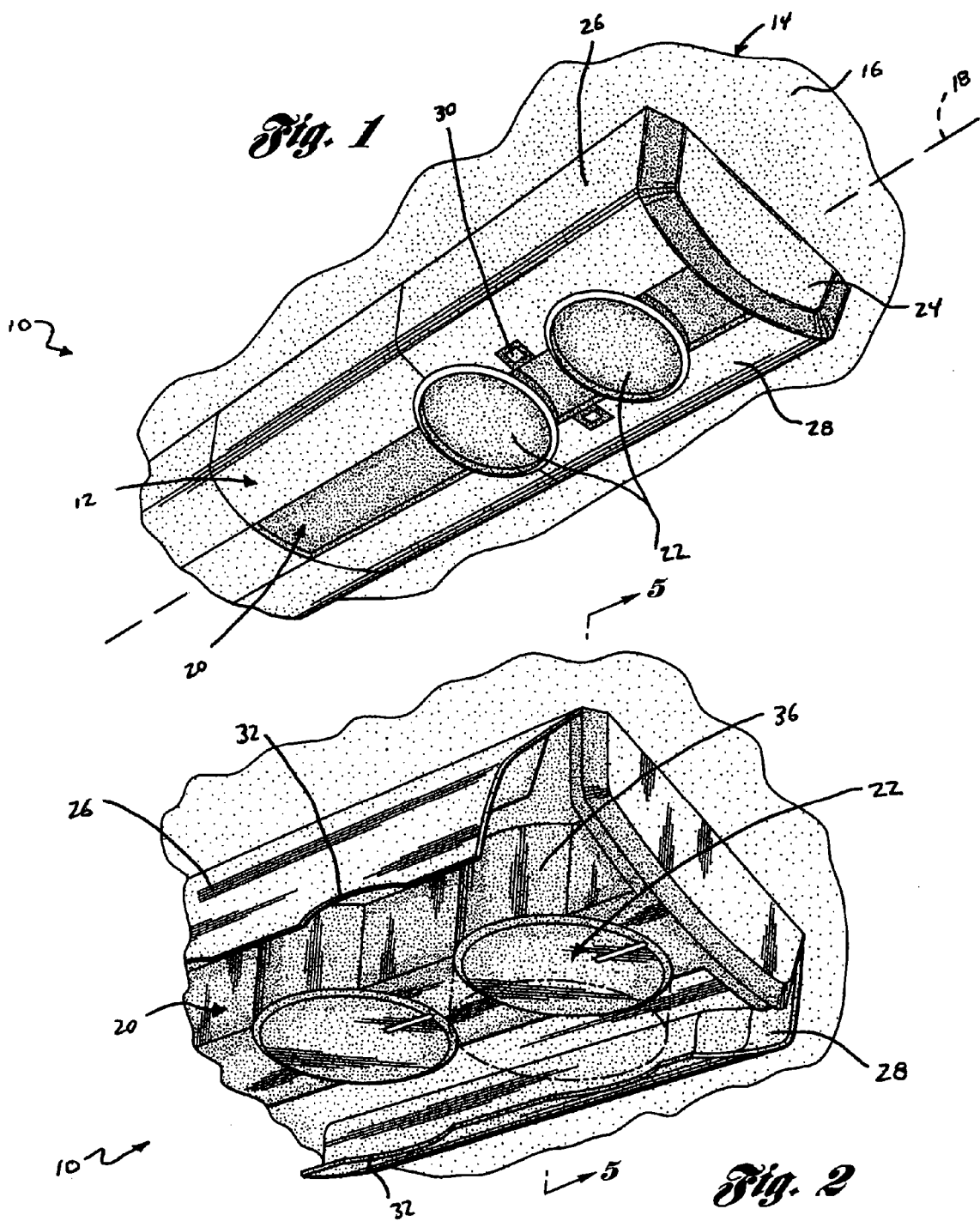

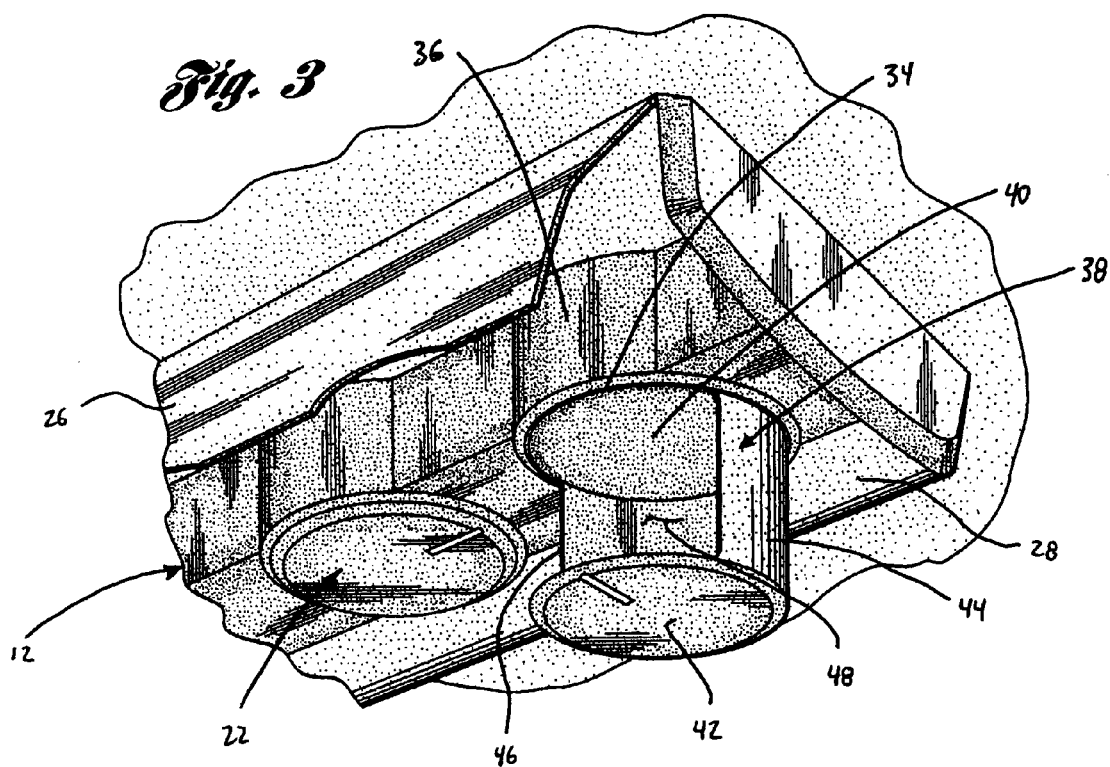
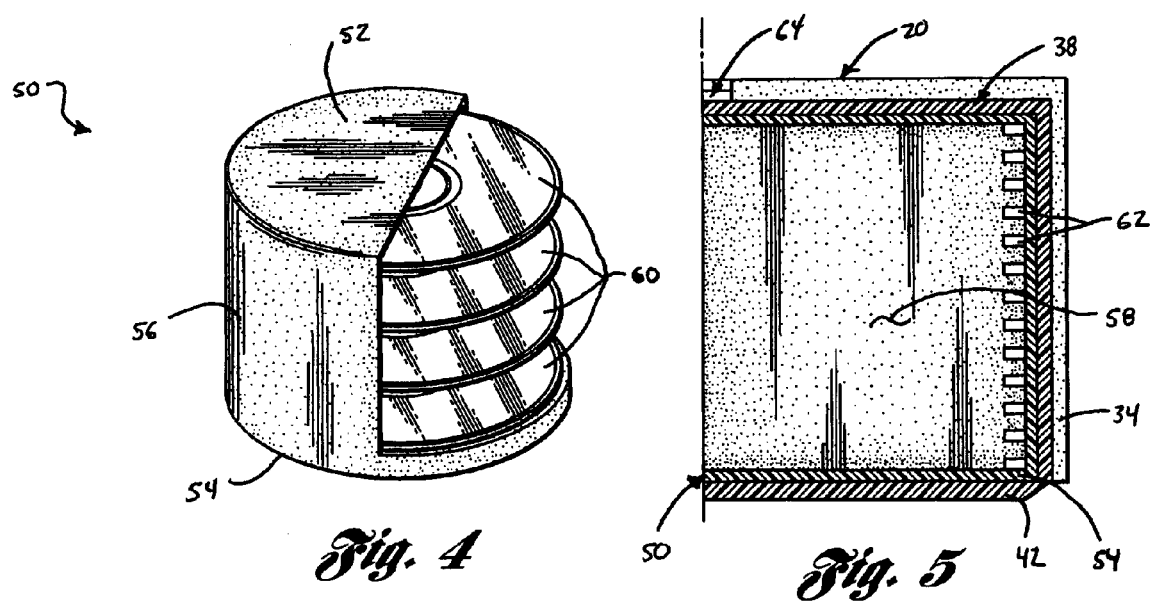

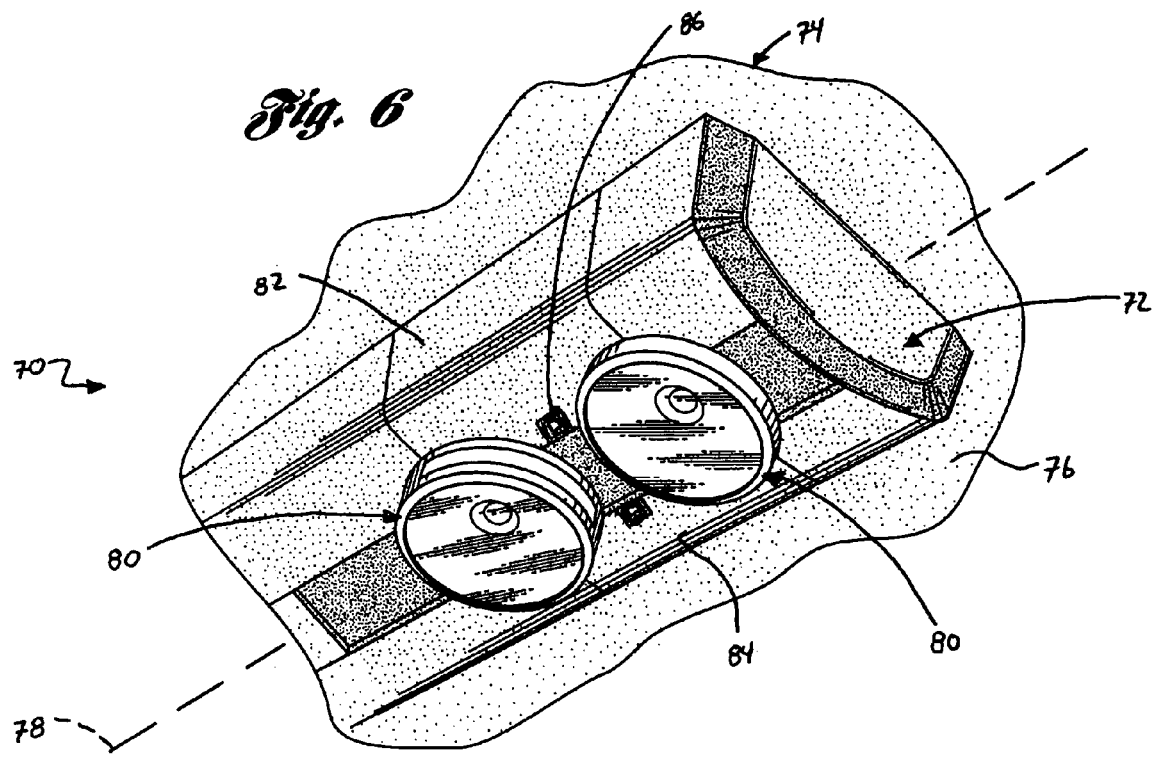
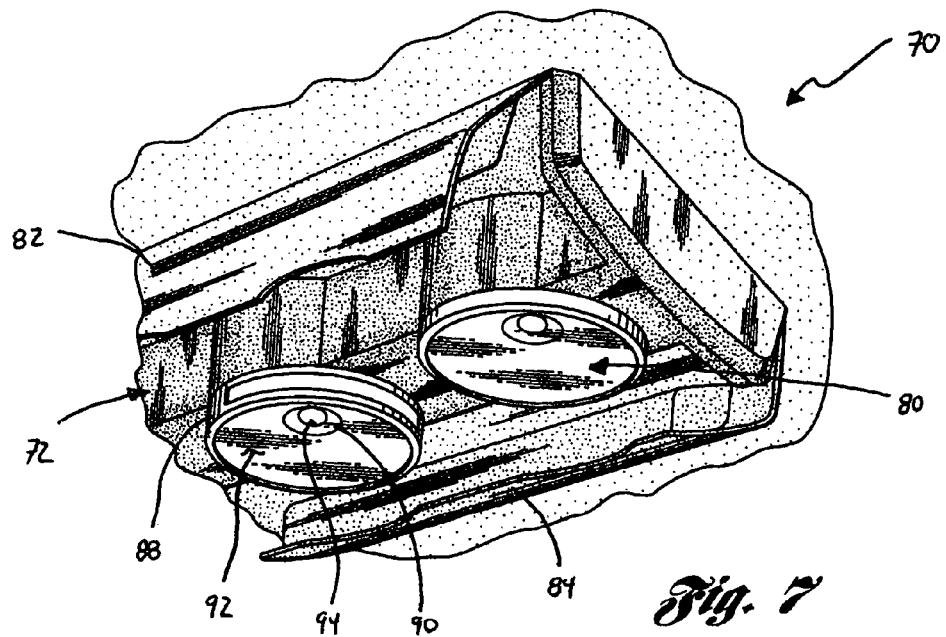

OVERHEAD CONSOLE ASSEMBLY

BACKGROUND OF THE INVENTION

1. Field of the Invention

The present invention relates to an overhead console assembly for use in the passenger compartment of a vehicle.

2. Background Art

Overhead consoles are commonly provided in the passenger compartment of a vehicle such as an automobile, boat or airplane. Overhead console assemblies are generally elongate structures disposed along the longitudinal axis of a headliner. The headliner includes an upper surface mounted to the interior roof structure of the vehicle and a lower surface having an overlay applied thereon.

The overhead console is mounted to the lower surface of the headliner to provide additional storage space for items such as sunglasses, garage door openers and compact discs. Current overhead console assemblies include a series of accessory compartments for storing items. The accessory compartments or storage bins are typically fixedly mounted within the console assembly to allow the passenger to stow and retrieve personal items from the compartment. Alternatively, the accessory compartments may be pivotally mounted to the console assembly.

One significant limitation of current overhead console assemblies is that stored items must be removed from the accessory compartments to transport the items between the vehicle and another location. It would be advantageous to provide an overhead console assembly for a vehicle having removable accessory compartments.

Another limitation of current overhead console assemblies is that the accessory compartments are not easily accessible to passengers sitting in various portions of the vehicle passenger compartment. It would be advantageous to provide an overhead console assembly that is adjustably mounted to the headliner of the vehicle allowing access to the accessory compartments or console features from a variety of seating locations.

SUMMARY OF THE INVENTION

The present invention overcomes the above-referenced problems associated with prior overhead console assemblies by providing an overhead console assembly for use in the passenger compartment of a vehicle. The overhead console assembly includes a headliner having an upper surface attachable to a vehicle roof and a lower surface facing the passenger compartment of the vehicle. An overhead console housing is configured for securement to the lower surface of the headliner. The console housing includes a lower surface and opposing pivotally mounted first and second doors at least partially covering the lower surface. At least one module is received in a channel in the lower surface of the console housing.

In one aspect of the present invention, the at least one module comprises a storage module releasably securable and adjustably positionable relative to the channel in the overhead console housing. The storage module includes a housing having a top surface, a bottom surface, a sidewall extending therebetween defining a receiving area therebetween accessible through an opening in the sidewall. An accessory module is removably mountable within the receiving area of the storage module housing to receive and secure one or more discs.

In another aspect of the present invention, the at least one module comprises a lighting fixture mounted in the overhead console housing. The lighting fixture includes a shroud, a reflector disposed within the shroud and a lens cooperating with the shroud to direct light into the passenger compartment of the vehicle. The lighting fixture may be rotatably mounted to the lower surface of the overhead console housing.

BRIEF DESCRIPTION OF THE DRAWINGS

FIG. 1 is a perspective view of an overhead console assembly in accordance with the present invention;

FIG. 2 is a perspective view of the overhead console assembly having a pair of doors pivoted open exposing one or more storage modules;

FIG. 3 is a perspective view of the storage module housing extending from the overhead console assembly;

FIG. 4 is a perspective view of a removable accessory module in accordance with the present invention;

FIG. 5 is a cross-sectional view of the accessory module housing and module in the overhead console assembly along line 5—5 of FIG. 2;

FIG. 6 is a perspective view of another aspect of the overhead console assembly; and FIG. 7 is a perspective view of another aspect of the overhead console assembly having a pair of doors pivoted open exposing lighting modules in accordance with the present invention.

DETAILED DESCRIPTION OF THE PREFERRED EMBODIMENT(S)

Referring now to FIG. 1, an overhead console assembly 10 in accordance with the present invention is disclosed. Overhead console assembly 10 includes an overhead console housing, generally referenced by numeral 12, secured to a portion of headliner 14 or to the frame of a vehicle roof. Headliner 14 comprises a structural member having an upper surface attached to the frame of the vehicle roof (not shown) and a lower surface 16 facing the passenger compartment of the vehicle receiving overhead console assembly 10.

Headliner 14 is generally formed as a one-piece structure which extends above the interior passenger compartment of a vehicle. Headliner 14 may have any suitable configuration and comprise any suitable materials, such as any suitable natural materials and/or synthetic materials. Furthermore, the headliner body may include a single layer or multiple layer construction. The headliner body may also include a cover material or overlay (not shown), such as a polymeric material or fabric, that faces the interior passenger compartment of the vehicle.

Overhead console assembly 10 is typically centrally disposed along a longitudinal axis 18 of headliner 14. Console housing 12 is assembled to the headliner assembly 14 or the vehicle frame with a series of fasteners (not shown). Overhead console housing 12 of overhead console assembly 10 includes a storage area 20 having a lower surface adapted to receive one or more storage modules 22. A forward portion 24 of housing 12 is preferably disposed adjacent a forward portion of the vehicle passenger compartment, positioning storage area 20 above the front passenger seats of the vehicle. However, it is understood that the overhead console assembly may be positioned in a variety of locations within the vehicle.

Referring now to FIGS. 1 and 2, a pair of doors 26, 28 are pivotally mounted on opposing sides of storage area 20 of console housing 12. Doors 26, 28 are movable between a closed position provided adjacent the storage modules 22 and an open position exposing modules 22. Each door 26, 28 includes a latch 30 securing doors 26, 28 adjacent storage modules 22. One or more notches 32 in doors 26, 28 allow access to modules 22 when doors 26, 28 are placed adjacent storage area 20. It is understood that the doors may be fixedly mounted to overhead console housing 12. In another aspect of the present invention, overhead lighting fixtures are secured to the storage area and are revealed when doors are opened.

Referring now to FIGS. 2 and 3, storage area 20 includes one or more channels 34 adapted to receive one or more storage module assemblies 22. As shown in FIG. 3, storage modules 22 are movable between a stored position received within channel 34 and a use position extending away from channel 34 toward the passenger compartment of the vehicle. In a preferred aspect of the present invention, cylindrical channels 36 are formed in storage area 20 of the console housing to receive a cylindrical storage module 22. However, a variety of geometries may be used to achieve the same result. Storage module assembly 22 includes a housing 38 having a top surface 40, a bottom surface 42 and a sidewall 44 extending therebetween. Sidewall 44 includes an opening 46 allowing access to a module receiving area 48 defined within housing 38.

Referring now to FIGS. 3–5, storage module 22 includes an accessory module 50 removably secured within module receiving area 48 of housing 38. In a preferred aspect of the present invention, accessory module 50 includes a top surface 52, a bottom surface 54 and a cylindrically shaped sidewall 56 extending therebetween. Cylindrical accessory module 50 is shaped to fit within the cylindrical housing 38 of storage module 22. It is understood that a variety of geometries may be used to accomplish the same results. For example, a rectangular accessory module may be removably secured within a corresponding rectangular storage module housing.

An accessory receiving area 58 defined between the top surface 52, bottom surface 54 and sidewall 56 is configured to store a variety of materials therein. As is shown in FIG. 4, module 50 is configured to hold a plurality of discs 60, such as audio compact discs or digital video discs, with a set of projections 62 provided on an interior surface of sidewall 56. It is understood that the accessory module can be configured to store a variety of objects depending on the selected geometry of the module. For example, a rectangular accessory module may be configured to receive a pair of sunglasses, tissue boxes, or garage door openers.

As shown in FIG. 5, housing 38 is received within channel 34 in the storage area 20 of console housing in the stored position. Accessory module 50 is inserted into module receiving area 48 of housing 38 such that the bottom surface 54 of accessory module 50 is supported by the bottom surface 42 of housing 38. A locking mechanism 64 disposed on an upper portion of the housing 38 releasably secures the housing 38 of storage module assembly 22. In a preferred aspect of the present invention, locking mechanism is a push-push fastener having a lower engaging portion and an upper spring loaded receiving portion secured to a portion of the storage area 20. However, it is understood that a variety of securement systems may be used to accomplish the same objectives. For example, opposing magnets, velcro securement sections or pin and hole mating portions may also be used to secure the housing within the channel of the console housing.

To move the storage module assembly 22 between a stored position and a use position, a user presses up against the bottom surface 42 of housing 38, causing lower engaging portion to disengage receiving portion. Housing 38 containing extends downward through channel 34 in storage area 20 such that the top surface 40 of housing 38 is substantially planar with the opening in channel 34 to expose accessory module 50 stored within receiving area 48. Housing 38 vertically translates through channel 34 in storage area 20 along a guide (not shown). However, it is understood that housing 38 may rotate downward through the channel.

Referring now to FIGS. 6–7, another aspect of the overhead console assembly of the present invention is disclosed. Overhead console assembly 70 includes an overhead console housing, generally referenced by numeral 72, secured to a portion of headliner 74 or the vehicle frame. Headliner 74 comprises an upper surface attached to the frame of a vehicle roof (not shown) and a lower surface 76 facing the passenger compartment of the vehicle receiving overhead console assembly 70. Electrical connections are provided through overhead console assembly 70 to power a variety of electrical components.

Overhead console assembly 70 is typically centrally disposed along the longitudinal axis 78 of headliner 14. Console housing 72 includes one or more light fixtures 80. A pair of doors 82, 84 are pivotally mounted on opposing sides of the console housing 72. Doors 82, 84 are movable between a closed position provided adjacent the lighting fixtures 80 and an open position exposing fixtures 80. Each door 82, 84 includes a latch 86 securing doors 82, 84 adjacent console housing 72. It is understood that the doors may be fixedly mounted to overhead console housing 72.

Lighting fixtures 80 include a shroud 88, a reflector 90 disposed within shroud 88 and a lens 92 extending above a bulb 94. Lens 92 is rotatably mounted to shroud to allow a user to refocus light from bulb 94. In another aspect of the present invention, lighting fixtures are pivotally or rotatably mounted to console housing, allowing a user to direct light to various positions in the passenger compartment of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular overhead console assembly and headliner combination for use in a passenger compartment of a vehicle, the combination comprising:

a headliner comprising a structural member having an upper surface attachable to a vehicle roof and a lower surface;

an overhead console housing configured for attachment adjacent to the lower surface of the headliner, the console housing having a lower surface and opposing pivotally mounted first and second doors at least partially covering the lower surface; and at least one module received in a channel in the lower surface of the console housing having at least one storage module releasably securable and adjustably positionable relative to the overhead console housing, the at least one storage module includes a housing having a top surface, a bottom surface, a sidewall extending therebetween defining a receiving area therebetween accessible through an opening in the sidewall, wherein the at least one storage module further comprises a locking mechanism disposed on the top surface of the housing for releasably securing the storage module to the console housing.

2. The combination of claim 1 wherein the at least one storage module further comprises an accessory module removably mountable within the receiving area of the storage module housing.

3. The combination of claim 2 wherein the accessory module is adapted to receive and secure one or more discs.

4. The combination of claim 1 wherein the at least one storage module further comprises a locking mechanism disposed on the top surface of the housing for releasably securing the storage module to the console housing.

5. The combination of claim 1 wherein the locking mechanism comprises a push-push locking mechanism.

6. The combination of claim 1 wherein the channel in the console housing, the at least one storage module housing and accessory module are cylindrical in cross-section.

7. A modular overhead console assembly for use with a passenger compartment of a vehicle having a headliner, the headliner having a structural member having an upper surface and a lower surface, the assembly comprising:

an overhead console housing configured for attachment adjacent to the lower surface of the headliner, the console housing having a lower surface, at least one channel formed in the lower surface and opposing pivotally mounted first and second doors at least partially covering the lower surface; and at least one storage module releasably securable and adjustably positionable relative to the channel in the overhead console housing, the at least one storage module includes a housing having a top surface, a bottom surface, a sidewall extending therebetween defining a receiving area therebetween accessible through an opening in the sidewall.

8. The assembly of claim 7 wherein the at least one storage module further comprises an accessory module removably mountable within the receiving area of the storage module housing.

9. The assembly of claim 8 wherein the accessory module is adapted to receive and secure one or more discs.

10. The assembly of claim 7 wherein the at least one storage module further comprises a locking mechanism disposed on the top surface of the housing for releasably securing the storage module to the console housing.

11. The assembly of claim 10 wherein the locking mechanism comprises a push-push locking mechanism.

12. The assembly of claim 7 wherein the channel in the console housing, the at least one storage module housing and accessory module are cylindrical in cross-section.

* * * * *